United States Patent Office 3,468,962
Patented Sept. 23, 1969

3,468,962
PROCESS FOR PREPARING PEROXYACETALS AND PEROXYKETALS
Giuliano Ballini and Carlo Bujtar, Ferrara, Italy, assignor to Montecatini Edison S.p.A., Milan, Italy, a corporation of Italy
No Drawing. Filed May 17, 1966, Ser. No. 550,643
Claims priority, application Italy, May 21, 1965, 11,441/65
Int. Cl. C07c 73/00, 43/30, 41/00
U.S. Cl. 260—610                                   10 Claims

ABSTRACT OF THE DISCLOSURE

Preparing peroxyacetals and peroxyketals by reacting alkylidene diperoxide with divalent alcohol, desirably in the presence of an acid catalyst.

---

The present invention relates to a new process for preparing peroxyacetals and peroxyketals. In particular, it is concerned with the transsemiacetalation of alkylidenediperoxides, i.e., the substition of an alkoxy group for an alkyl peroxy group in an alkylidenediperoxide by exchange with a mono- or divalent alcohol, either in the presence or absence of acid catalysts.

In one embodiment, the invention relates to a method for the transsemiacetalation of an alkylidenediperoxide prepared in situ, with a mono- or divalent alcohol, in the presence of an acid catalyst.

Peroxyacetals or peroxyketals, which may also be called peroxyethers, are characterized by the presence of an alkoxy group (—OR) and of a peroxy group (—OOR') linked to the same ternary or quaternary carbon atom. Previously proposed methods for the preparation thereof include the addition of an organic hydroperoxide to an alpha-unsaturated ether in the presence of acid catalysts in a homogeneous or heterogeneous system. According to a particular method disclosed in our copending U.S. patent application Ser. No. 505,761, filed on Oct. 29, 1965, solid catalysts are employed, such as e.g., cationic resins, active carbon, acid mineral salts and the like.

Peroxyketals can also be prepared by heating an acetal with an alkylhydroperoxide at 90° C. (see Rieche et al., Chem. Ber. 94, 2457 (1961)).

In both cases, these methods require availability of raw materials, such as alpha-unsaturated ethers or acetals, which can be prepared only with difficulty and can not be conveniently produced in large-scale commercial quantities.

In addition, the preparation of alkylideneperoxides by reaction between a carbonyl compound (aldehyde or ketone) and an organic hydroperoxide has been previously proposed. This reaction takes place in the presence of acid catalysts and uses readily available raw materials. In particular, in copending application Ser. No. 434,620, filed Feb. 23, 1965, solid compounds of acidic nature, such as cationic exchange resins and active earths, have been proposed for use as catalysts in a process which is suitable as a continuous process with a fixed-bed catalyst.

It has now been found that peroxyacetals and peroxyketals can be prepared by a reaction involving simply heating an alkylideneperoxide with a mono- or divalent alcohol, preferably in the presence of acid catalysts.

The present invention therefore provides a process for the preparation of peroxyacetals and peroxyketals having the general formulae:

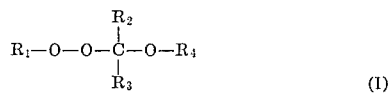
(I)

and

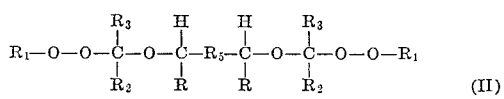
(II)

wherein R is a hydrogen atom or an alkyl, cycloalkyl or aralkyl radical containing up to 10 carbon atoms; $R_1$ is an alkyl or aralkyl radical containing up to 10 carbon atoms; $R_2$ and $R_3$ are hydrogen atoms, alkyl or cycloalkyl radicals containing up to 10 carbon atoms, which radicals may be halogen-substituted, or one of the two radicals $R_2$ or $R_3$ can be also

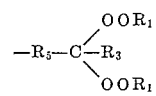

or $R_2$ and $R_3$ may, taken together and in conjunction with the central carbon atom (C) to which they are bonded from a cycloaliphatric ring; $R_4$ is a primary or secondary alkyl, aralkyl or cycloalkyl radical containing up to 10 carbon atoms; and $R_5$ is an alkylene, cycloalkylene, or arylene radical containing up to 10 carbon atoms, which radical may be alkyl- or halogen-substituted, or $R_5$ is —$(R_6O)_n$—$R_7$— wherein $R_6$ and $R_7$ are lower alkylene and $n$ is an integer from 1 to 9, which process comprises reacting an alkylidenediperoxide having the formula:

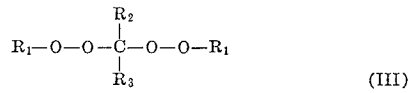
(III)

wherein $R_1$, $R_2$ and $R_3$ are as defined above, with a monovalent alcohol, $R_4$—OH, or with a divalent alcohol having the formula:

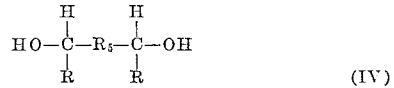
(IV)

wherein $R_4$, R and $R_5$ are as defined above, the reaction being continued until 1 mol of hydroperoxide,

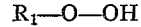

is liberated per mol of starting alkylidenediperoxide.

During this reaction an exchange occurs first between only one peroxy group (—O—$OR_1$) of the alkylidenediperoxide and an alkoxy group (e.g., —$OR_4$) with the formation, as a by-product, of hydroperoxide ($R_1$—OOH).

The reaction leads to an equilibrium. Thus, in order to obtain the desired product, it is convenient to operate in the presence of an excess of reactants, preferably of the alcohol and/or to remove the formed hydroperoxide continuously, e.g., by distillation. The removal of the formed hydroperoxide can be effected by distillation under vacuum or with the use of an azeotroping agent. Removal of the formed hydroperoxide is the preferred expedient when the boiling point of the formed hydroperoxide or of the azeotrope is lower than that of the reactants and in particular of the alcohol. When this is not the case, the shifting of the reaction toward the desired product will be made easier by using an excess of alcohol.

In order to avoid further progression of the reaction, which would result in the exchange of an alkoxy group with the second peroxy group of the alkylidenediperoxide, with formation of the corresponding ketal or acetal, it is convenient to stop the reaction by cooling when the stoichiometric amount of hydroperoxide, corresponding to 1 mol per mol of starting alkylidenediperoxide, is formed. It has been ascertained, furthermore, that the rate of the second stage of transacetalation is much lower than that of the first stage and furthermore, that the process is reversible in the presence of free hydroperoxide.

The transacetalation reaction is carried out at a temperature ranging from $-15°$ C. to $100°$ C., preferably from $0°$ C. to $90°$ C., either in the presence or absence of acid catalysts, the alkylidenediperoxide and the mono- or divalent alcohol being present in molar ratios ranging from a considerable excess of either one of the two reactants (varying from about 4:1 to 1:5 mols to the stoichiometric quantity (1:1 and 2:1 mols, respectively, depending on whether a monovalent or divalent alcohol is used). An excess of alcohol is preferably employed.

The alkylidenediperoxides which may be reacted with mono- or divalent alcohols in the process of the present invention include, e.g.:

1,1-di-tert.butylperoxyethane
1,1-di-tert.butylperoxypropane
2,2-di-tert.butylperoxypropane
2,2-di-tert.butylperoxybutane
alpha,alpha-di-tert.butylperoxytoluene
alpha,alpha,alpha',alpha'-tetra-tert.butylperoxyxylenes
1,1-di-tert.butylperoxy-cyclopentane
1,1-di-tert.butylperoxy-3,5,5-trimethyl-cyclohexane
Beta,beta'-di-tert.butylperoxy-methylbutyrate
Beta,beta'-di-tert.butylperoxy-ethylbutyrate
Gamma,gamma-di-tert.butylperoxymethylvalerate
Gamma,gamma-di-tert.butylperoxyethylvalerate In general, there may be employed the alkylidenediperoxides derived from the reaction between an aliphatic, cycloaliphatic, aromatic, carbonyl or polycarbonyl compound such as, e.g., acetone, acetylacetone, diacetonealcohol, cyclohexanone, cyclohexanedione, benzoylacetone, formaldehyde, acetaldehyde, benzaldehyde, etc., and an organic hydroperoxide, in particular tert.butylhydroperoxide. Such reaction may be conducted in the presence of acid catalysts (e.g., by the method disclosed in U.S. Patent 2,455,569) or in the presence of heterogeneous acid catalysts (as in the method disclosed in application Ser. No. 434,620, filed on Feb. 23, 1965).

In accordance with an alternative embodiment of the present invention, the alkylidenediperoxide can be formed in situ. In this case, the process of the invention starts by first reacting carbonyl compounds, hydroperoxides and alcohols, in the presence of acid catalysts, to form the alkylidenediperoxides, this being followed, in situ, by the transsemiacetalation reaction to form the peroxyacetals or peroxyketals, without separating of the intermediate product.

The alcohols which may be used in the present invention are primary or secondary aliphatic alcohols, cycloaliphatic alcohols, aliphatic glycols, primary or secondary alkylaromatic alcohols etc. These include, e.g., methanol, ethanol, higher aliphatic alcohols containing up to 18 carbon atoms, cyclopentanol, terpenols, benzyl alcohol, butanediol-1,3; butanediol-1,4; pentanediol-1,3; pentanediol-1.4; diethylene glycol, polyethylene glycol, m-xylylene glycol, p-xylylene glycol and the monoalkyl ether of ethylene glycol.

The acid catalysts which may be employed to accelerate the rate of the transsemiacetalation reaction can be either soluble or insoluble in the reaction medium. The soluble catalysts include for example mineral acids, such as $HCl$, $HBr$, $H_3PO_4$, $HF$, $BF_3$ and $H_2SO_4$, and organic sulfonic acids. Among the insoluble catalysts that can be used according to this invention can be mentioned silicic acids (also silica gel), organic sulfonic acids, heteropolyacids, active acidic earths, ion exchange cationic resins (H form), acidic alumina, active carbons, Friedel-Crafts type catalysts and acid carbon blacks.

The amounts of homogeneous acid catalyst which are generally used to accelerate the transsemiacetalation reaction are preferably between about 0.01 and 50.0 parts by weight per 100 parts of reaction mixture.

The process of the present invention can be conveniently carried out continuously by passing the reactants into a column through a fixed bed of heterogeneous acid catalyst.

Carrying out the process of the present invention in the presence of solvent can prove to be advantageous, especially when the alkylidenediperoxide and the alcohol are poorly soluble in each other. As solvents, inert type solvents are generally used, e.g., dioxane, diethyl ether, petroleum ether, pentane, hexane, heptane, cyclohexane, benzene, toluene, xylene, decane, tetralin, decalin, etc.

The peroxyacetals and peroxyketals prepared according to the process of the present invention are particularly useful as free radical polymerization initiators curing agents for elastomers, cross-linking agents for plastomers, agents for improving the cetane number of gasolines, etc.

The following examples are intended to further illustrate the present invention without restricting its scope.

EXAMPLE 1.—PREPARATION OF 2-METHOXY-2-TERT.BUTYLPEROXYPROPANE

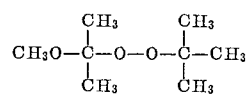

55 g. of 2,2-di-tert.butylperoxypropane, 16 g. of methanol and 1 g. of cationic exchange resin, Kastel C-300, were introduced into a 250 cc. flask. The mixture was kept under agitation and heated under reflux on a water bath. At regular intervals two samples of 0.1 cc. were taken in order to determine free hydroperoxide iodometrically.

Active oxygen present in peroxidic form and active oxygen present in hydroperoxidic form can be separately iodometrically analyzed. (See, e.g., Dickey et al., J. Amer. Chem. Soc. 71, 1432 (1949).)

The total active oxygen present in the reaction mixture was determined by treating the 0.1 cc. sample with 25 cc. of glacial acetic acid and 2 g. of potassium iodide, and boiling for 25 minutes in a flask provided with a reflux condenser. After washing the condenser with 50 cc. of water, titration was carried out at room temperature with a N/10 solution of sodium thiosulfate. Hydroperoxidic active oxygen was determined by treating the second 0.1 cc. sample with 50 cc. of isopropanol, 2 cc. of glacial acetic acid and 2 cc. of a saturated KI solution, and boiling for 2 minutes under reflux. After washing the condenser with 50 cc. of water, titration was carried out at room temperature with a N/10 solution of sodium thiosulfate.

Peroxidic active oxygen was calculated by difference between total active oxygen and hydroperoxidic active oxygen thus determined.

The values of the ratio, $$2 \times \frac{\text{hydroperoxidic active oxygen}}{\text{total peroxidic active oxygen}} \times 100$$

corresponding to the yield of formed monoperoxyketal are reported in the following table as a function of time:

TABLE 1

| Time (minutes) | Percent monoperoxyketal $\left(2 \times \dfrac{\text{hydroperoxidic active oxygen}}{\text{peroxidic active oxygen}} \times 100\right)$ |
|---|---|
| 0 | 0 |
| 30 | 12.5 |
| 60 | 27 |
| 90 | 43 |
| 120 | 58 |
| 150 | 72 |
| 180 | 88 |

After about 3 hours of reaction, the formed peroxide was separated from the resin by filtration, and then washed free of excess methanol by washings with 15% aqueous solutions of NaOH.

38 g. were obtained of a substance which was then distilled under vacuum. The fraction boiling at 33–34° C./10 mm. Hg was collected. This fraction weighed 31 g. and was identified as 2-methoxy-2-tert.-butylperoxypropane. Its characteristics were:

|  | Found | Calculated |
|---|---|---|
| Density $n_D^{20}$ | 1.4003 | |
| Molecular weight | 158 | 162 |
| Active oxygen (percent) | 9.5 | 9.87 |
| Percent carbon | 53.5 | 53.3 |
| Percent hydrogen | 9.3 | 9.47 |

The yield with respect to starting 2,2-di-tert.-butylperoxide was 74%.

EXAMPLE 2

55 g. of 2,2-di-tert.-butylperoxy-propane, 50 cc. of dioxane, 20 cc. of methanol and 2 g. of sulfonated resin of the type Kastel C–300 (in acid form) were introduced into a flask provided with a stirrer and a reflux condenser and maintaind at 65° C. in a water bath.

The course of the reaction was followed by determining the ratio $$2 \times \frac{\text{hydroperoxidic active oxygen}}{\text{peroxidic active oxygen}} \times 100$$

as described in Example 1.

The values of this ratio as a function of time are reported in the following table:

TABLE 2

| Time (minutes): | Percent monoperoxyketal formed |
|---|---|
| 0 | 0 |
| 30 | 11.5 |
| 60 | 24.6 |
| 90 | 41.0 |
| 120 | 55.0 |
| 150 | 70.5 |
| 180 | 85.0 |

After 3 hours, the reaction was stopped and dioxane was distilled off at 30–35° C./70 mm. Hg. Then 2-methoxy-2-tert.-butylperoxypropane was isolated as described in Example 1. 28 g. of the peroxide were obtained, corresponding to a yield of 66.5%.

EXAMPLE 3

55 g. of 2,2-di-tert.-butylperoxypropane, 20 cc. of methanol and 1 g. of W.M. Valdol earth (acidity, 65 meq./100 g.) having the following composition by weight:

|  | Percent |
|---|---|
| $SiO_2$ | 64.74 |
| $Al_2O_3$ | 11.35 |
| MgO | 0.74 |
| CaO | 2.82 |
| $Fe_2O_3$ | 2.58 |
| $TiO_2$ | Traces |
| $SO_3$ | 0.11 |
| $H_2O$ | 5.23 | were reacted in a flask provided with a stirrer and a reflux condenser, kept at a temperature of 65° C.

As in Example 1, the course of the reaction was followed by iodometric determination of active oxygen.

The values of the ratio:

$$2 \times \frac{\text{hydroperoxidic active oxygen}}{\text{peroxidic active oxygen}} \times 100$$

are reported in the following table as a function of time:

TABLE 3

| Time (minutes): | Percent monoperoxyketal formed |
|---|---|
| 0 | 0 |
| 30 | 3.6 |
| 60 | 9.0 |
| 90 | 13.1 |
| 120 | 18.6 |
| 150 | 22.8 |
| 180 | 27.0 |
| 210 | 29.0 |
| 240 | 30.0 |

After 3 hours, the reaction was stopped and 2-methoxy-2-tert.-butylperoxypropane was separated from the catalyst and isolated as described in Example 1.

8.2 g. of peroxide were obtained, corresponding to a yield of 20.2%.

EXAMPLE 4

55 g. of 2,2-di-tert.-butyleperoxypropane, 20 cc. of methanol and 2 g. of potassium bisulfate (Carlo Erba, Milan, pure product for analysis) were reacted in a flask provided with a stirrer and a reflux condenser, kept at 65° C.

The following table shows the percentage values of monoperoxyketal formed, as a function of time, determined as in Example 1.

TABLE 4

| Time (minutes): | Percent monoperoxyketal formed |
|---|---|
| 0 | 0 |
| 30 | 4.2 |
| 60 | 10.5 |
| 90 | 14.6 |
| 120 | 20.5 |
| 150 | 23.8 |
| 180 | 28.1 |
| 210 | 30.3 |

The reaction was then stopped and 2-methoxy-2-tert. butylperoxypropane was isolated as described in Example 1.

8.5 g. of peroxide were obtained, corresponding to a yield of 21%.

EXAMPLE 5

55 g. of 2,2-di-tert.butylperoxypropane, 20 cc. of methanol and 2 g. of anhydrous colloidal silicic acid (hydrated silica, Hi-Sil 233, Columbia-Southern Chemical Corporation) having the following composition (by weight) and properties:

| | | |
|---|---|---|
| $SiO_2$ | percent | 87 |
| CaO | do | 0.5 |
| $Al_2O_3$ | do | 0.6 |
| $H_2O$ (approx.) | do | 10.0 |
| NaCl (approx.) | do | 1.0 |
| pH | | 7 |
| Surface area | m.$^2$/g | 150 | were introduced into a flask provided with a stirrer and a reflux condenser kept at a temperature of 65° C.

The course of the reaction was followed by the iodometric analysis described in Example 1. The percentage values of the monoperoxyketal formed are reported in the following table as a function of time:

TABLE 5

| Time (minutes): | Percent monoperoxyketal formed |
|---|---|
| 0 | 0 |
| 30 | 2.5 |
| 60 | 6.3 |
| 90 | 11.1 |
| 120 | 16.3 |
| 150 | 20.2 |
| 180 | 23.0 |
| 210 | 25.0 |

The reaction was then stopped and 2-methoxy-2-tert. butylperoxypropane was isolated as described in Example 1.

7.2 g. of peroxide were obtained, corresponding to a yield of 17.8%.

EXAMPLE 6

55 g. of 2,2-di-tert.butylperoxypropane, 20 cc. of methanol and 2.5 g. of carbon black Kosmobil 77 (United Carbon Company) having the following characteristics:

| | | |
|---|---|---|
| Surface area | m.$^2$/g | 116 |
| Diameter of the particles | mμ | 27 |
| Volatile substances | percent | 5.7 |
| pH=4.3. | | | were introduced into a flask provided with a stirrer and a reflux condenser, kept at a temperature of 65° C.

The course of the reaction was followed by iodometric titration of the active oxygen as described in Example 1. The results are reported in the following table:

TABLE 6

| Time (minutes): | Percent monoperoxyketal formed |
|---|---|
| 0 | 0 |
| 30 | 2.8 |
| 60 | 7.1 |
| 90 | 12.3 |
| 120 | 17.5 |
| 150 | 23.0 |
| 180 | 25.0 |
| 210 | 28.2 |

The reaction was then stopped and 2-methoxy-2-tert. butylperoxypropane was isolated as described in Example 1. 9.5 g. of peroxide were obtained, corresponding to a yield of 23.5%.

EXAMPLE 7

220 g. of 2,2-di-tert.butylperoxypropane and 100 cc. of ethanol were introduced into a flask provided with stirrer, separatory funnel and thermometer. The solution was externally cooled with a cryoscopic mixture at 0° C. and 5 cc. of concentrated HCl were slowly added, the temperature not being allowed to exceed 0° C.

The mixture was maintained under agitation at 0° C. for 2 hours and then poured into water and the upper layer separated.

The reaction product was washed with water and then with a 10% aqueous solution of NaOH to remove the formed hydroperoxide and as thereafter dried over anhydrous $Na_2SO_4$. 2-ethoxy-2-tert.butylperoxypropane was isolated by fractional distillation under vacuum, the fraction boiling at 47–48° C. mm. Hg being collected.

105 g. of product corresponding to a 60% yield were obtained. It had the following characteristics:

| | Found | Calculated |
|---|---|---|
| $n_D^{20}$ | 1.4048 | |
| Active oxygen | 9.3 | 9.1 |

EXAMPLE 8

165 g. of 2,2-di-tert.butylperoxypropane, 200 g. of 2-ethylhexyl alcohol and 2 g. of p-toluenesulfonic acid were introduced into a flask which was maintained at 70° C. under a vacuum of 45 mm. Hg for 2 hours.

The residue was then washed with a 10% aqueous solution of NaOH and dried. The unreacted 2-ethylhexanol and the unreacted 2,2-di-tert.butylperoxypropane were distilled off under vacuum, keeping the bath at 60° C. and the vacuum at 1 mm. Hg. Then the residue was passed through a chromatographic column filled with alumina (for chromatography) and eluted with petroleum ether.

After evaporation of the solvent, 146 g. of 2-(2-ethylhexoy)-2-tert.butylperoxypropane, corresponding to a yield of 75%, were obtained. It had the following characteristics:

| | Found | Calculated |
|---|---|---|
| d | 0.8280 | |
| $n_D^{20}$ | 1.4240 | |
| Percent active oxygen | 6.25 | 6.10 |
| Cryoscopic moecular weight | 276 | 260 |

EXAMPLE 9

103 g. of 1,1-di-tert.butylperoxyethane, 150 g. of 2-ethylhexyl alcohol and 1.5 g. of p-toluenesulfonic acid were introduced into a flask.

By operating as described in Example 8, 170 g. (corresponding to a yield of 69.0%) of 1-tert.butylperoxy-1-(2-ethylhexoxy)propane were obtained. It had the following characteristics:

| | Found | Calculated |
|---|---|---|
| d | 0.8572 | |
| $n_D^{20}$ | 1.4238 | |
| Percent active oxygen | 6.2 | 6.45 |
| Cryoscopic molecular weight | 248 | 260 |

EXAMPLE 10

55 g. of 2,2-di-tert.butylperoxypropane, 120 g. of benzyl alcohol and 2 g. of cationic resin Kastel C–300 were introduced into a flask provided with a reflux condenser and a stirrer. The mixture was kept under agitation at 80° C. for 1 hour and then filtered to remove the resin.

The filtrate was washed with water, then with a 10% aqueous solution of NaOH to remove the formed hydroperoxide and the residue was then dried over anhydrous $Na_2SO_4$.

The product thus obtained was distilled under a vacuum which was allowed to increase to 0.5 mm. Hg, while the bath was kept at 60° C. so as to distill off all of the 2,2-di-tert.butylperoxypropane and as much as possible of the unreacted benzyl alcohol.

The thus obtained residue was then chromatographically analyzed in a column over $Al_2O_3$ and eluted with petroleum ether.

The residue, after solvent evaporation, corresponds to 2-benzyloxy-2-tert.butylperoxypropane, having the following characteristics:

| | Found | Calculated |
|---|---|---|
| $n_D^{20}$ | 1.4641 | |
| Percent active oxygen | 6.9 | 7.2 |
| Cryoscopic molecular weight | 215 | 222 |

EXAMPLE 11

A mixture consisting of 55 g. of 2,2-di-tert.butylperoxypropane and 100 cc. of methanol was introduced into a flask provided with a reflux condenser. Samples were taken at the times given below in order to determine the hydroperoxide formed, as described in Example 1, while keeping the reaction mixture at the boiling point in a water bath.

The percentage value of monoperoxyketal formed, as a function of time, is reported in the following table:

TABLE 7

| Time (minutes): | Percent monoperoxyketal formed |
|---|---|
| 0 | 0 |
| 30 | 6.3 |
| 60 | 10.2 |
| 90 | 15.2 |
| 120 | 28.0 |
| 150 | 39.8 |
| 180 | 52.3 |
| 210 | 72.7 |
| 240 | 87.0 |

29.5 g. of 2-methoxy-2-tert.butylperoxypropane were obtained, corresponding to a yield of 73%.

EXAMPLE 12

55 g. of 2,2-di-tert.butylperoxypropane, 55 g. of diethylene glycol, 150 cc. of dioxane and 3 g. of ion-exchange resin Kastel C–300 were introduced into a flask provided with a stirrer and a reflux condenser. The mixture was kept under agitation at 80° C. for 2.5 hours and then filtered to remove the resin.

The filtrate was subjected to vacuum distillation at 70 mm. Hg to distill off the dioxane and the residue was then poured in water. The upper organic layer was separated and washed three times with a 10% aqueous solution of NaOH.

After drying over $Na_2SO_4$, the resulting product was distilled under vacuum which was allowed to increase to 0.5 mm. Hg, while keeping the bath at 65° C. The residue was then passed through the chromatographic column filled with $Al_2O_3$, and eluted with petroleum ether.

The product obtained after evaporation of the solvent, β,β'-di[(2-tert.butylperoxy)isopropoxy]diethyl ether,

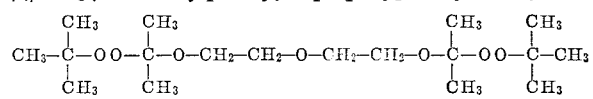

had the following characteristics:

| | Found | Calculated |
|---|---|---|
| Percent active oxygen | 8.6 | 8.75 |
| Molecular weight | 345 | 366 |
| Melting point (° C) | 94 | |

EXAMPLE 13

58 g. of acetone, 45 g. of tert.butylhydroperoxide and 64 g. of methanol were introduced into a flask provided with a stirrer, thermometer and separatory funnel, and the mixture was externally cooled with ice to 0° C. 10 cc. of concentrated HCl were added dropwise, the temperature of the solution not being allowed to exceed 5° C.

After 30 minutes reaction, the mixture was poured into water and the upper organic layer was separated and washed first with water and then three times with 10% NaOH and dried over $Na_2SO_4$.

A crude product weighing 32 g. was obtained and subjected to fractional distillation under vacuum through a Widmer column. The following fractions were collected:

I. 43–46° C./35 mm. Hg (acetonedimethylacetal) __ 1.6
II. 33–34° C./10 mm. Hg (2-methoxy-2-tert.butylperoxypropane) _____ 7.6
III. 58–61° C./10 mm. Hg (2,2-di-tertbutylperoxypropane) _____ 21

EXAMPLE 14

A column (25 mm. internal diameter, 2000 mm. length) provided with an external heating jacket was filled with a sulfonic ion-exchange resin of the Kastel C–300 type and kept at a constant temperature of 60° C. by circulating warm water in the external heating jacket.

A mixture of 2,2-di-tert.butylperoxypropane and methanol, in a molar ratio of 1:2, was passed downward through this column from top to bottom at a flow rate of 12–15 cc./minute. The liquid coming out from the column was poured into water and 2-methoxy-2-tert.butylperoxypropane was isolated from the separated upper organic layer as described in Example 1.

EXAMPLE 15

39 g. of 1,1-di-tert.butylperoxycyclohexane and 50 cc. of ethanol were introduced into a flask. 3 g. of cationic ion-exchange resin of the Kastel C–300 type were added and the mass kept at reflux over a bath maintained at a constant temperature of 80° C. After two and a half hours, the reaction mixture was filtered to remove the resin and the filtrate was washed three times with water and then thrice with a 10% aqueous solution of NaOH.

The mixture was dried over $Na_2SO_4$ and distilled under vacuum. 1-methoxy-1-tert.butylperoxycyclohexane was collected at 48–50° C./0.5 mm. Hg.

17.6 g. of peroxide were obtained, which corresponds to a yield of 58%.

The obtained product had the following characteristics:

| | Found | Calculated |
|---|---|---|
| $n_D^{20}$ | 1.4408 | |
| Active oxygen | 7.5 | 7.9 |

Variations can be of course be made without departing from the spirit and scope of the invention.

Having thus described our invention, what we desire to secure by Letters Patent and hereby claim is:

1. A process for preparing peroxyethers of the general formula

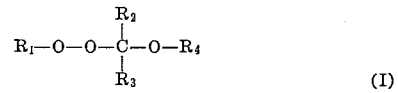

$R_1$ is an alkyl or aralkyl radical containing up to 10 carbon atoms; $R_2$ and $R_3$ are hydrogen atoms, alkyl or cycloalkyl radicals containing up to 10 carbon atoms, which radicals may be halogen-substituted, or one of the two radicals $R_2$ or $R_3$ can be also

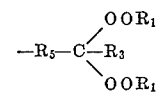

or $R_2$ and $R_3$ may, taken together and in conjunction with the central carbon atom (C) to which they are bonded form a cycloaliphatic ring; $R_4$ is a primary or secondary alkyl, aralkyl or cycloalkyl radical containing up to 10 carbon atoms, said process comprising reacting, at a reaction temperature in the range of from about −15° C. to +100° C., in the presence of from about 0 to 50 parts by weight of acid catalyst per 100 parts of the reaction mixture, (1) an alkylidenediperoxide having the formula:

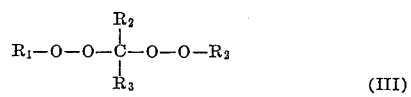

wherein $R_1$, $R_2$ and $R_3$ are as defined above, with (2) a monovalent alcohol, $R_4$—OH, wherein $R_4$ is as defined above, the molar ratio of said alkylidenediperoxide to said alcohol being in the range of from about 4:1 to 1:5, and continuing the reaction until up to 1 mol of hydroperoxide, $R_1$—O—OH, is liberated per mol of said starting alkylidenediperoxide.

2. The process of claim 1 wherein the reaction is carried out at a temperature in the range of from about 0° C. to 90° C.

3. The process of claim 1 wherein the reaction is carried out in the presence of an acid catalyst.

4. The process of claim 1 wherein the reaction is carried out in the absence of an acid catalyst.

5. The process of claim 1 wherein an excess of alcohol is used.

6. The process of claim 1 wherein stoichiometric amounts of the alkylidenediperoxide and the alcohol are used.

7. The process of claim 1 wherein the alkylidenediperoxide is prepared in situ.

8. The process of claim 3 wherein the acid catalyst is selected from the group consisting of mineral acids, silicic acids, sulfonic acids, heteropolyacids, acid earths, cationic exchange resins in acid form, acid alumina, active carbons, Friedel-Crafts catalysts and acid carbon blacks.

9. The process of claim 1 wherein the alcohol is selected from the group consisting of primary and secondary aliphatic alcohols, cycloaliphatic alcohols, aliphatic glycols, and primary and secondary alkyl aromatic alcohols.

10. A process for preparing peroxyethers of the general formula:

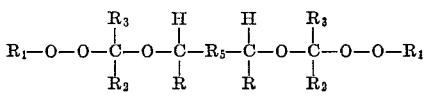

wherein R is a hydrogen atom or an alkyl, cycloalkyl or aralkyl radical containing up to 10 carbon atoms; $R_1$ is an alkyl or an aralkyl radical containing up to 10 carbon atoms; $R_2$ and $R_3$ are hydrogen atoms, alkyl or cycloalkyl radical containing up to 10 carbon atoms, which radicals may be halogen-substituted or one of the two radicals $R_2$ or $R_3$ can be also

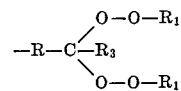

or $R_2$ and $R_3$ may, taken together and in conjunction with the central carbon atom (C) to which they are bonded form a cycloaliphatic ring; and $R_5$ is an alkylene, cycloalkylene, or arylene radical containing up to 10 carbon atoms, which radical may be alkyl or halogen substituted, or $R_5$ is $—(R_6O)_n—R_7—$ wherein $R_6$ and $R_7$ are lower alkylene and $n$ is an integer from 1 to 9, said process comprising reacting at a reaction temperature in the range of about $-15°$ C. to $+100°$ C. in the presence of from about 0 to 50 parts by weight of acid catalyst per 100 parts of the reaction mixture, an alkylidenediperoxide having the formula:

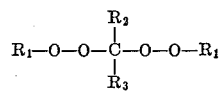

wherein $R_1$, $R_2$ and $R_3$ are as defined above with a divalent alcohol having the formula

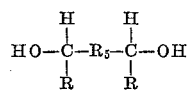

wherein R and $R_5$ are as defined above, the molar ratio of said alkylidenediperoxide to said alcohol being in the range of from 4:1 to 1:5, and continuing the reaction up until 1 mol of hydroperoxide, R—OOH, is liberated per mole of said starting alkylidenediperoxide.

No references cited.

BERNARD HELFIN, Primary Examiner

W. B. LONE, Assistant Examiner